United States Patent

Marino

[11] Patent Number: 5,975,478
[45] Date of Patent: Nov. 2, 1999

[54] PAPER HOLDER HAVING A SECURE GRIPPING FEATURE

[75] Inventor: Nicholas Marino, 52 Sherman Ave., Hawthorne, N.J. 07506

[73] Assignee: Nicholas Marino, Hawthorne, N.J.

[21] Appl. No.: 09/075,916

[22] Filed: May 11, 1998

[51] Int. Cl.[6] .................................................. A47B 97/04
[52] U.S. Cl. .................. 248/442.2; 248/451; 248/316.3; 248/918; 211/45; 40/341; 40/658
[58] Field of Search ................................ 248/442.2, 447, 248/451, 452, 453, 460, 441.1, 473, 918, 316.3, 316.2, 113; 211/45, 100; 40/341, 348, 658; 400/679, 717, 718

[56] References Cited

U.S. PATENT DOCUMENTS

| | | | |
|---|---|---|---|
| 473,135 | 4/1892 | Thayer | 40/658 X |
| 1,486,762 | 3/1924 | Jones | 248/113 |
| 1,911,781 | 5/1933 | Wolfe et al. | 248/113 |
| 4,085,848 | 4/1978 | Tsuge | 248/316.3 X |
| 4,089,116 | 5/1978 | Bearinger | 40/658 X |
| 4,120,475 | 10/1978 | Penner | 248/451 |
| 5,035,392 | 7/1991 | Gross et al. | 248/918 X |
| 5,078,358 | 1/1992 | Egly et al. | 248/442.2 X |
| 5,082,235 | 1/1992 | Crowther et al. | 248/442.2 X |
| 5,125,612 | 6/1992 | McNeal | 248/918 X |
| 5,292,099 | 3/1994 | Isham et al. | 248/442.2 |
| 5,383,642 | 1/1995 | Strassberg | 248/918 X |
| 5,467,950 | 11/1995 | Dumitru | 248/118.1 |
| 5,499,793 | 3/1996 | Salansky | 248/918 X |
| 5,678,792 | 10/1997 | Arguin et al. | 248/442.2 X |
| 5,864,977 | 2/1999 | Alvern | 40/658 |

FOREIGN PATENT DOCUMENTS

650290  9/1937  Germany ................ 248/473

*Primary Examiner*—Ramon O. Ramirez
*Assistant Examiner*—Stephen S. Wentsler
*Attorney, Agent, or Firm*—David L. Volk

[57] ABSTRACT

A top piece is adapted to rest along a top surface of a monitor, and two side pieces extend downwardly from opposite ends of the top piece, and are adapted to rest along opposite side surfaces of the monitor. The top piece and the side pieces each include slots disposed longitudinally therein, through which sheets of paper may be inserted. Each of the side pieces has a support arm pivotally attached thereto, which swings outwardly from the side piece to support the sheet of paper. The top piece is telescopingly adjustable, to fit various size monitors. The side pieces each include a threaded extension at one end thereof, for attaching the side piece to the top piece. An internally threaded knob is rotatably mounted at each end of the top piece, and is configured to receive the threaded extension by manually rotating the knob. Each of the side pieces has a first bearing track and a second bearing track which is opposite the first bearing track. The bearing tracks are disposed longitudinally within the side piece. The bearings within the first bearing track are offset in relation to the bearings within the second bearing track, and the bearing tracks are positioned close enough together so that a sheet of paper placed between the bearing tracks will bend slightly about portions of the bearings. In this manner, the paper is held snugly within the side piece.

3 Claims, 3 Drawing Sheets

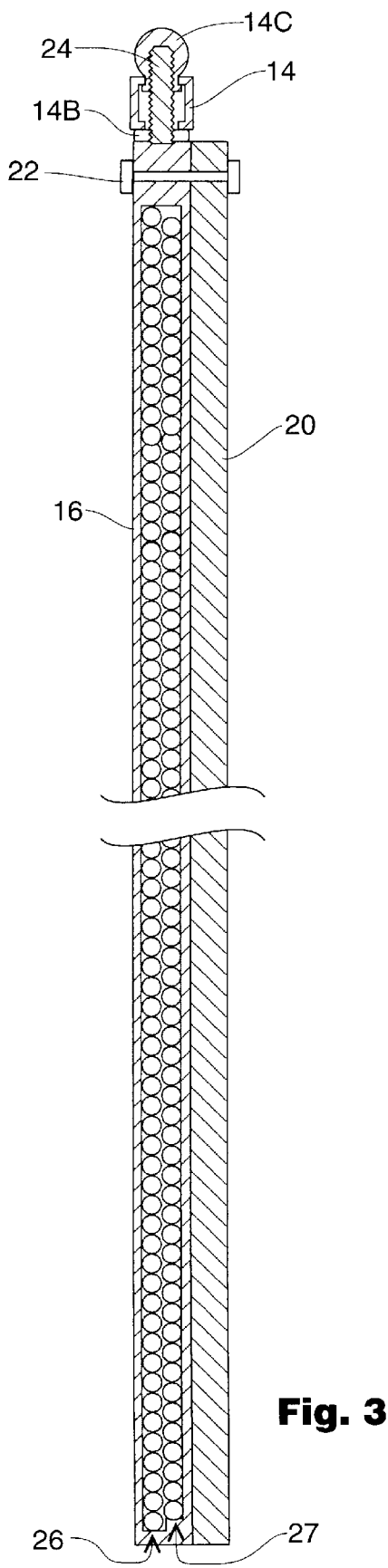
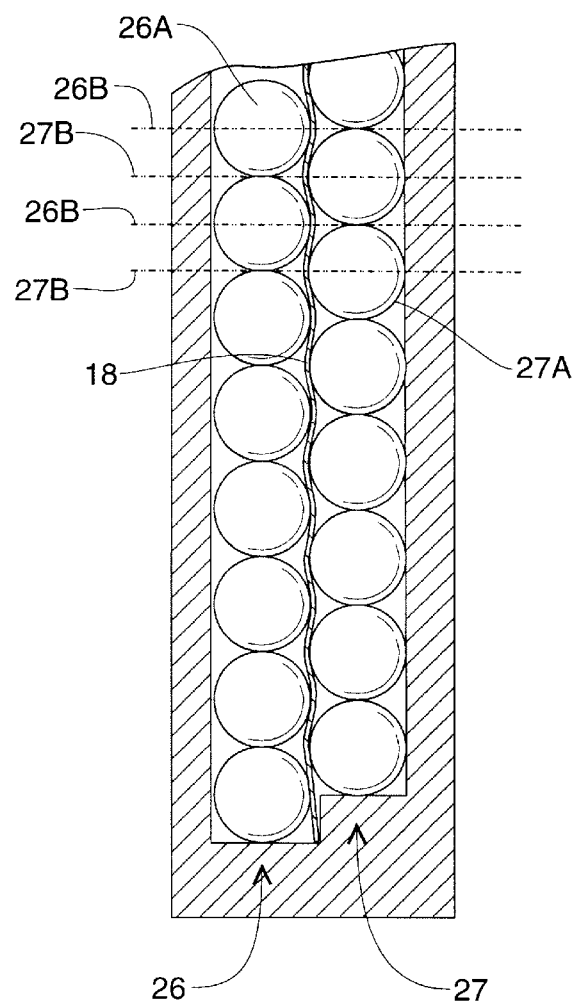
Fig. 3
Fig. 4

PAPER HOLDER HAVING A SECURE GRIPPING FEATURE

BACKGROUND OF THE INVENTION

1. Field of the Invention

The present invention relates to holders, particularly to paper holders which are attachable to other apparatus.

2. Description of the Related Art

So many people around the world use personal computers, both at home and at the office, that accessories which make using them easier, more convenient, and more productive are in demand. Often, when typing information from a printed page, a person sets the page on the desk next to the keyboard, and turns his or her head to the side at an uncomfortable position to view the paper while typing. If the person is not a proficient typist, he or she must turn his or her head many times from the page to the monitor and keyboard, then back again.

Paper holders have been developed which adhesively attach to a computer monitor screen, to alleviate the above problem. Such paper holders are also convenient for holding reminder notes and the like. No paper holders have been invented which have the adjustability, ease of use, large paper holding capacity, and firm paper holding capabilities of the present invention.

SUMMARY OF THE INVENTION

The paper holder of the present invention includes a top piece and two side pieces. The top piece is adapted to rest along a top surface of a monitor, and the two side pieces extend downwardly from opposite ends of the top piece, and are adapted to rest along opposite side surfaces of the monitor. The top piece and the side pieces each include slots disposed longitudinally therein, through which sheets of paper may be inserted.

Each of the side pieces has a support arm pivotally attached thereto, which swings outwardly from the side piece to support the sheet of paper. The top piece is telescopingly adjustable to fit various size monitors.

The side pieces each include a threaded extension at one end thereof, for attaching the side piece to the top piece. An internally threaded knob is rotatably mounted at each end of the top piece, and is configured to receive the threaded extension by manually rotating the knob.

Each of the side pieces has a first bearing track and a second bearing track which is opposite the first bearing track. The bearing tracks are disposed longitudinally within the side piece. The bearings within the first bearing track are offset in relation to the bearings within the second bearing track, and the bearing tracks are positioned close enough together so that a sheet of paper placed between the bearing tracks will bend slightly about portions of the bearings. In this manner, the paper is held snugly within the side piece.

Still further features and advantages will become apparent from the ensuing description and drawings.

BRIEF DESCRIPTION OF THE DRAWINGS

FIG. 3 is a cross-sectional view taken along line 3—3 of FIG. 2.

FIG. 4 is an enlarged partial cross-sectional view of the side piece, shown with a sheet of paper inserted between the bearing tracks.

DETAILED DESCRIPTION

Figure 1:
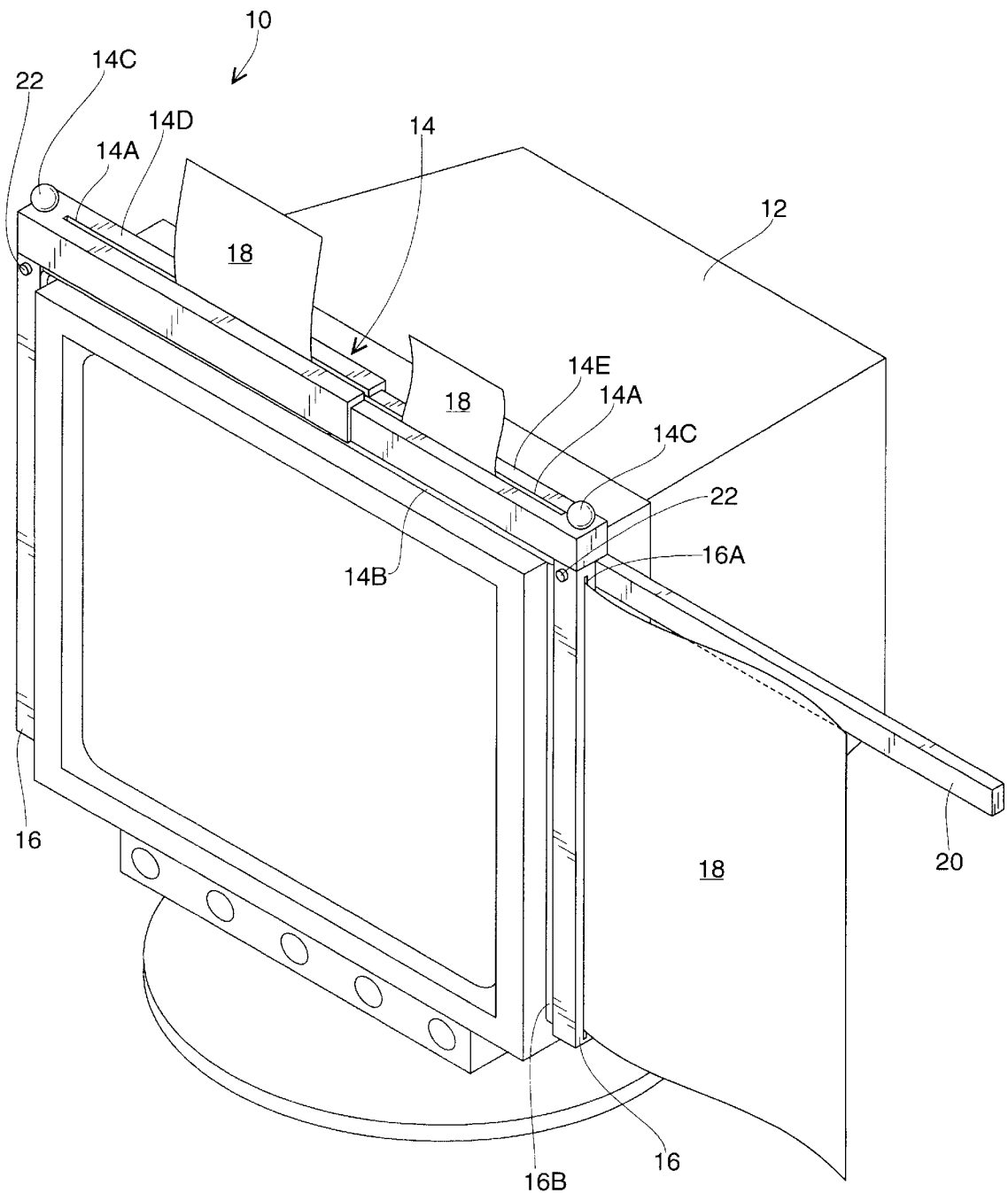
FIG. 1 is a perspective view of a paper holder of the present invention, in use on a monitor.

FIG. 1 is a perspective view of a paper holder 10 of the present invention, in use on a monitor 12. The paper holder 10 comprises a top piece 14 adapted to rest along a top surface of the monitor 12, and two side pieces 16 which extend downwardly from opposite ends of the top piece 14, along opposite side surfaces of the monitor 12. The paper holder 10 is shown with several sheets of paper 18 inserted through a slot 14A of the top piece 14, and through a slot 16A of one of the side pieces 16. Although one of the side pieces 16 is shown without a sheet of paper 18 inserted therein, both side pieces 16 are configured in the same manner, and both are capable of holding sheets of paper 18.

Each of the side pieces 16 has a support arm 20 pivotally attached thereto, which swings outwardly from the side piece 16 to support the sheet of paper 18.

Figure 2:
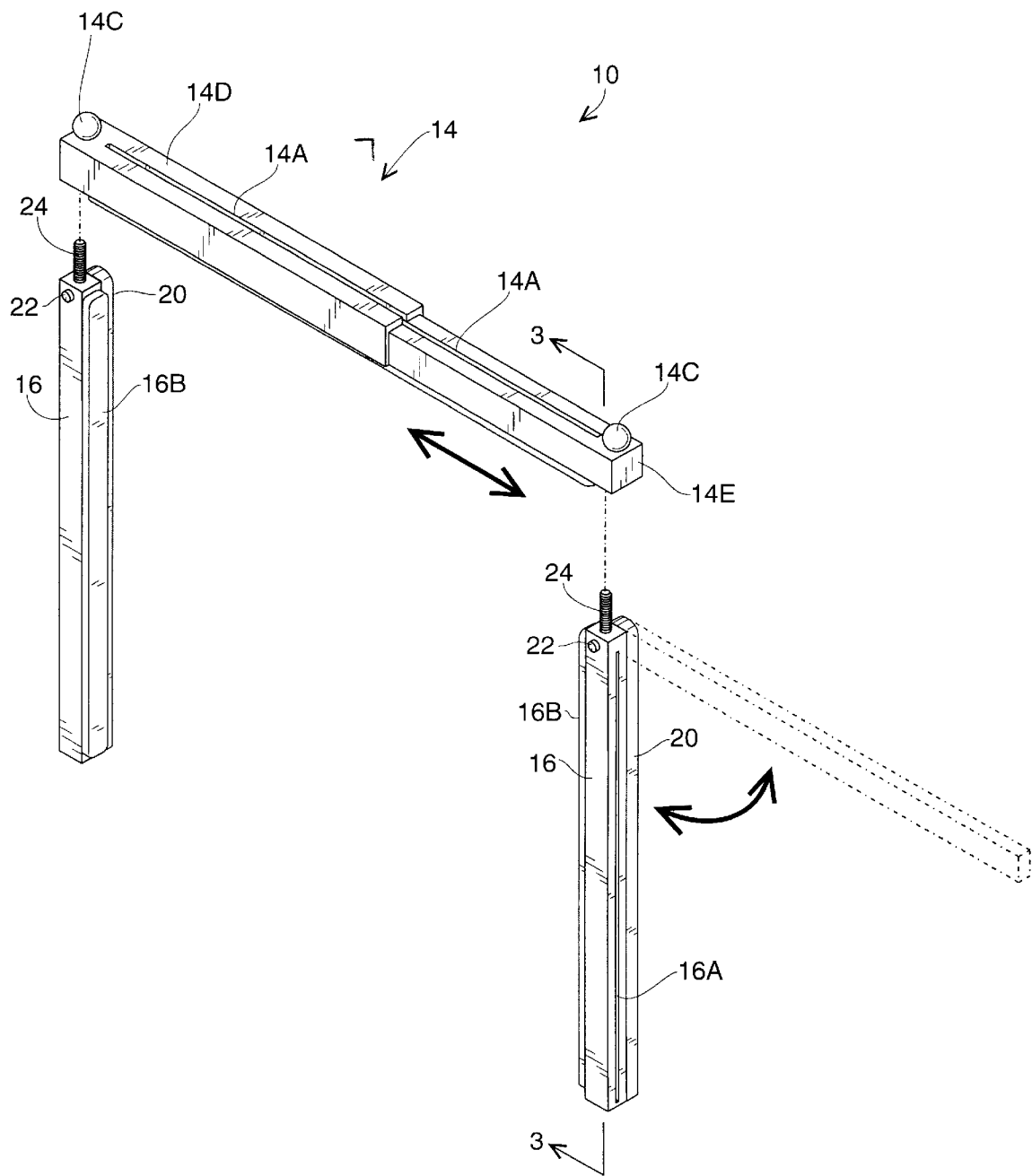
FIG. 2 is an exploded perspective view of the paper holder.

FIG. 2 is an exploded perspective view of the paper holder 10. The top piece 14 is telescopingly adjustable, to fit various size monitors 12. The top piece 14 includes a sleeve 14D and an extension 14E which slides snugly within the sleeve 14D. This snug fit helps to maintain a grip on the monitor 12 between the side pieces 16, so that no adhesive is required to maintain the paper holder 10 on the monitor 12.

The top piece 14 and the side pieces 16 each include a resilient pad 14B, 16B, of rubber, foam or other suitable material on a surface opposite its respective slot 14A, 16A. These pads 14B, 16B protect the outer surface of the monitor 12. The support arms 20 are mounted to the side pieces 16 by a pivot pin 22.

FIG. 3 is a cross-sectional view taken along line 3—3 of FIG. 2. Referring to FIGS. 2 and 3 the side pieces 16 each include a threaded extension 24 at one end thereof, for attaching the side piece 16 to the top piece 14. An internally threaded knob 14C is rotatably mounted at each end of the top piece 14, and is configured to receive the threaded extension 24 by manually rotating the knob 14C.

Each of the side pieces 16 has a first bearing track 26 and a second bearing track 27 which is opposite the first bearing track 26. The bearing tracks 26, 27 are disposed longitudinally within the side piece 16. FIG. 4 is an enlarged partial cross-sectional view of the side piece 16, shown with the sheet of paper 18 inserted between the bearing tracks 26, 27. The bearing tracks 26, 27 include bearings 26A, 27A therein.

Each of the bearings 26A, 27A has a centerline 26B, 27B which is perpendicular to the bearing track 26, 27. The centerlines 26B of the first bearing track 26 are offset in relation to the centerlines 27B of the second bearing track 27. The bearing tracks 26, 27 are positioned close enough to each other that the sheet of paper 18, when placed between the bearing tracks 26, 27, is forced to bend slightly about a portion of each of the bearings 26A, 27. This structure results in a more firm holding of the sheet of paper 18.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A paper holder comprising:

a. an elongated member having a slot disposed therein;

b. a first bearing track and a second bearing track disposed within the elongated member, along the slot;

c. the second bearing track disposed opposite and parallel to the first bearing track;
d. the first bearing track and the second bearing track each including bearings therein;
e. wherein a geometric plane passing through a center of any one of the bearings within the first bearing track and being perpendicular to a longitudinal axis of the first bearing track passes between adjacent ones of the bearings within the second bearing track;
f. a distance between centers of any two adjacent ones of the bearings within the first bearing track being substantially equal to a diameter of any one of the bearings;
g. a distance between centers of any two adjacent ones of the bearings within the second bearing track being substantially equal to the diameter of any one of the bearings; and
f. the bearing tracks being positioned close enough together that when a sheet of paper is placed between the bearing tracks, the sheet of paper will bend slightly about portions of the bearings.

2. The paper holder of claim 1, further comprising a support arm pivotally attached to the elongated member for supporting a sheet of paper inserted in the slot.

3. A paper holder comprising:
a. an elongated top piece including an elongated extension and an elongated sleeve, the extension being snugly slidable within the sleeve, so that the top piece is telescopingly adjustable;
b. the top piece having a first end and a second end;
c. a first side piece and a second side piece, the first side piece being connectable to the first end of the top piece, the second side piece being connectable to the second end of the top piece;
d. the second side piece having a slot disposed longitudinally therein, the slot adapted to receive a sheet of paper therein;
e. the top piece adapted to rest upon a top surface of a computer monitor, and the first and second side pieces adapted to extend downward from the top piece along opposing sides of the computer monitor, so that the paper holder is capable of gripping the monitor without need for adhesive;
f. a support arm pivotally attached to the second side piece for supporting a sheet of paper insured in the slot;
g. the second side piece further including:
 i. a first bearing track and a second bearing track disposed within the second side piece, along the slot;
 ii. the second bearing track disposed opposite the first bearing track;
 iii. the first bearing track and the second bearing track each including bearings therein;
 iv. wherein a geometric plane passing through a center of any of the bearings within the first bearing track and being perpendicular to a longitudinal axis of the first bearing track passes between adjacent ones of the bearings within the second bearing track;
 v. a distance between centers of any two adjacent ones of the bearings within the first bearing track being substantially equal to a diameter of any one of the bearings;
 vi. a distance between centers of any two adjacent ones of the bearings within the second bearing track being substantially equal to the diameter of any one of the bearings; and
 vii. the bearing tracks being positioned close enough together that when a sheet of paper is placed between the bearing tracks, the sheet of paper will bend slightly about portions of the bearings.

* * * * *